United States Patent [19]

Brod et al.

[11] Patent Number: 5,179,182
[45] Date of Patent: Jan. 12, 1993

[54] COPOLYMERISATION OF UNSATURATED ESTERS

[75] Inventors: Ramah J. Brod, Marcham, United Kingdom; Robert L. Elliott, Baton Rouge, La.; Jean P. P. Coquerel, Waterloo, Belgium

[73] Assignee: Exxon Research & Engineering, Florham Park, N.J.

[21] Appl. No.: 532,105

[22] Filed: May 30, 1990

Related U.S. Application Data

[63] Continuation of Ser. No. 106,713, Oct. 8, 1987, abandoned, which is a continuation of Ser. No. 664,551, Oct. 25, 1984, abandoned.

[30] Foreign Application Priority Data

Sep. 6, 1983 [GB] United Kingdom ............... 8323897

[51] Int. Cl.$^5$ ................................................. C08F 4/28
[52] U.S. Cl. ..................................... 526/227; 526/319; 526/325; 526/328; 526/329.7
[58] Field of Search ............... 526/328, 329.7, 319, 526/325, 227

[56] References Cited

U.S. PATENT DOCUMENTS

| | | | |
|---|---|---|---|
| 3,522,228 | 7/1970 | Fukui et al. | 260/94.9 |
| 3,720,651 | 3/1973 | Imoto et al. | 526/216 |
| 4,085,264 | 4/1978 | Seib et al. | 526/47 |

FOREIGN PATENT DOCUMENTS 136813A 10/1985 United Kingdom ............... 526/325

OTHER PUBLICATIONS

Sorenson et al.: Preparative Methods of Polymer Chemistry: Interscience Publishers, Inc. (1961), pp. 9, 160 and 161.

*Primary Examiner*—Joseph L. Schofer
*Assistant Examiner*—Alex H. Walker
*Attorney, Agent, or Firm*—V. T. White

[57] ABSTRACT

The reaction cycle time for the copolymerization of unsaturated esters such as alkyl fumarates and vinyl acetate, and for the polymerization of methacrylates and acrylates may be dramatically reduced by carrying out the polymerization at elevated temperatures and pressures. An additional feature is the addition of initiator during polymerization which leads to improved products especially for lubricating oil pour depressants and fuel and crude oil flow improvers.

12 Claims, No Drawings

COPOLYMERISATION OF UNSATURATED ESTERS

This is a continuation of application Ser. No. 106,713, filed Oct. 8, 1981, now abandoned, which is a R.60 continuation of U.S. Ser. No. 664,551, filed Oct. 25, 1984, now abandoned based on U.K. 83-23897, filed Sep. 6, 1983.

The invention relates to a process for the preparation of polymers and copolymers of unsaturated esters especially for use as additives for liquid hydrocarbons especially fuels and lubricating oils and the products prepared thereby. Particularly the invention relates to an improved process for the preparation of pour point depressing additive materials for combination with waxy mineral lubricating oils. More particularly the invention relates to an improved process for the preparation of pour point depressing lubricating oil additive materials and additives for fuels and crude oils by copolymerizing an ester of an unsaturated polycarboxylic acid with a second polymerisable material in the presence of a peroxide catalyst.

The art of additive manufacture for hydrocarbon fuels and lubricants has long been familiar with the preparation of polymers and copolymers to form materials useful for improving desirable characteristics of the hydrocarbons such as improving the viscosity index, that is, for reducing the rate of change of viscosity of an oil with a change in temperature and reducing the pour point of hydrocarbon fuels including crude, residual and distillate oils. Such materials as polymers and copolymers of acrylate esters, polymers and copolymers of alpha-beta unsaturated poly-carboxylic acid esters, etc., have been found to be very satisfactory for many purposes. It has also been found, however, that the preparation of these polymers and copolymers presents many technical difficulties.

It has long been known to polymerise dialkyl fumarates and vinyl acetate to produce copolymers suitable as pour depressants for lubricating oils. Similarly it has been known to copolymerise alkyl acrylates and methacrylates of differing alkyl groups to produce other copolymers useful as lubricant additives and acrylates and methacrylates of varying compositions to produce pour depressants for hydrocarbon fuels and crude oils. To date these materials have been produced by free-radical polymerisation at atmospheric pressure and at a temperature around the normal boiling point of the solvent. Whilst this technique has produced satisfactory materials it suffers from the disadvantage that the polymerisation time needed has been as high as 10 to 20 hours and that the products obtained can vary by an undesirable amount. For example U.S. Pat. No. 2,936,300 shows copolymerisation of vinyl acetate and alkyl fumarates using 5 to 15 hours.

Typically the processes used have employed cyclohexane as a solvent and have been carried out at atmospheric pressure and around 85° C. with a 15 hour cycle time.

We have now found that the polymerisation cycle time may be dramatically reduced and the consistency of the product improved if the polymerisation is carried out under elevated pressure and at temperatures generally above the normal boiling temperature of one or more of the monomers. The pressure being sufficient to prevent vapourisation of the monomers. This process also allows reduced cycle times using volatile solvents which are easily removed after polymerisation if the pressure is high enough to prevent vaporisation of the solvent during polymerisation. We have also found that by using the higher pressures of the present invention there is a greater flexibility to select the most efficient initiator for the particular polymerisation.

In the previously proposed processes carried out at atmospheric pressure all the initiator and the reactants are injected into the reaction vessel at the start. As a further feature the catalyst and some or all of the reactants may be injected during the polymerisation reaction which can give better control of the reaction.

The present invention therefore provides a process for the polymerisation or copolymerisation of unsaturated esters comprising the free radical solvent polymerisation under a blanket of an inert gas at a pressure in the range 5 p.s.i. to 1600 p.s.i. and at a temperature in the range 85° to 200° C. preferably 90° C. to 200° C. and using a free radical generating catalyst having a half life no greater than 2 hours at the reaction temperature.

As a further feature of the present invention the free radical generating catalyst is injected into the reaction vessel during all or part of the reaction time. If desired a monomer may also be injected during the reaction.

The choice of the exact reaction conditions to be used will depend upon the unsaturated esters being polymerised, the particular catalyst being used and the properties desired in the product. We have found however that in many instances the use of the process of the present invention has the following significant advantages over the previously used processes. The reaction time may be reduced from 15 to 20 hours to, in some instances, as little as one and a quarter hours. We have also found that the new process allows improved flexibility and better control of the specific viscosity of the material obtained.

The present invention is applicable to many unsaturated ester but we are particularly concerned with the polymerisation and copolymerisation of acrylates and methacrylates and the copolymerisation of alkyl fumarates and vinyl acetate to produce those materials which find widespread use as pour depressants in lubricating oils and hydrocarbon fuels.

Unsaturated di- and tri-carboxylic acid esters which may be polymerised according to the present invention include those represented by the following formula

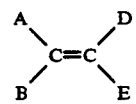

wherein (1) A and D are carboxylic acid ester groups

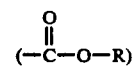

and B and E are hydrogen, e.g., fumaric acid esters, maleic acid esters, etc., or (2) A and D are carboxylic acid ester groups, as above, and either B or E is a methyl group, the other being hydrogen, e.g., citraconic acid esters, mesaconic acid esters, etc., or (3) A and B are hydrogen, D is a carboxylic acid ester group and E is a methylene carboxylic acid ester group, e.g., itaconic acid esters, or (4) A and D are carboxylic acid ester groups as above, E is a methylene carboxylic acid ester group and B is hydrogen, e.g., aconitic acid esters.

It will be noted that the unsaturation in all of these compounds is alpha-beta to at least one carboxy group. Although any of the carboxylic acid esters, according to the formula above, or mixtures of such polycarboxylic acid esters, are operable in the process of this invention, the fumaric acid esters and maleic acid esters are particularly advantageous. Mixtures of two or more of such unsaturated polycarboxylic acid esters in varying proportions, i.e., 10–90 parts fumaric and 90–10 parts maleic ester, may be used in place of only one ester.

The esters may be prepared by esterification of any of the unsaturated polycarboxylic acids or their anhydrides with alcohols selected from the $C_1$ to $C_{30}$ aliphatic alcohols and mixtures thereof. Primary alcohols are preferred over secondary and tertiary alcohols, although secondary alcohols are sometimes suitable. The alcohols are preferably saturated, although some degree of unsaturation is permissible when mixtures of alcohols are employed. Straight chain or lightly branched alcohols are preferred over highly branched alcohols.

These unsaturated carboxylic acid ester may readily be copolymerised by the process of the present invention with other polymerizable monomeric materials. These monomers may be represented by the following formula:

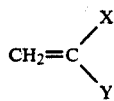

wherein
(1) X is hydrogen and Y is an ester group

R being methyl, ethyl, butyl and the like) e.g., vinyl acetate, vinyl butyrate and the like, or (2) X is methyl, ethyl, etc., and Y is as described above, e.g. isopropenyl acetate, etc., or (3) X is halogen and Y is as described above, e.g. alpha-chlorovinyl acetate, etc., or (4) X is a hydrogen or methyl and Y is an aromatic group, e.g., styrene, alpha-methyl styrene, and the like, or (5) X is hydrogen of methyl and Y is —C=N, e.g., acrylonitrile, etc.

Although any of the polymerizable monomeric materials typified by the formula above are operable to form useful copolymers with carboxylic acid esters outlined above, the preferred embodiment contemplates the use of vinyl compounds, particularly vinyl esters and their substitution products. Vinyl fatty acid esters containing from about 2 to about 18 carbons are particularly operable, such as vinyl acetate, vinyl propionate, vinyl butyrate, vinyl laurate, vinyl stearate and the like. Mixtures of such vinyl esters, e.g., 10–90 parts of vinyl acetate and 90–10 parts of isopropenyl acetate, may be used in place of a relatively pure vinyl ester. Vinyl acetate is particularly preferred.

The invention is equally applicable to the copolymerisation of alkyl fumarates and vinyl acetate to produce materials useful as pour depressants in lubricating oils or flow improvers for fuels and crude oils. Also the polymerisation or copolymerisation of alkyl acrylates and methacrylates to produce heavy fuel and crude oil flow improvers, viscosity index improvers and pour depressants for lubricating oils, the copolymers of alkyl methacrylates being particularly useful as viscosity index improvers for automatic transmission fluids. The monomers to be polymerised will be selected according to the desired use of the polymer.

The products of the present invention are particularly useful as lubricant additives where they find use as viscosity index improvers and pour point depressants and as flow improvers for fuels. We also find that the improved control allowed by the process of the present invention allows products of better consistency and hence improved potency as lubricant additives to be obtained. The products may be used in conjunction with other conventional lubricant additives such as dispersants, viscosity index improvers, viscosity index improver dispersants, antiwear additives such as the zinc dialkyl dithiophosphates and metal containing detergents such as the basic alkaline earth metal sulphonates and phenates.

The present invention is illustrated by reference to the following Examples in which the fumarate ester used in Examples 1 to 7 was a mixed $C_8$ to $C_{18}$ linear dialkyl fumarate and the initiator was tertiary butyl peroctoate. The polymerisations were carried out under a blanket of nitrogen and in Examples 1 to 4 they were carried out in a 3 liter reactor and in Examples 5 to 7 in a ten cubic meter reactor. The conditions, quantities of material used and materials obtained in Examples 1 to 4 are given in Table 1 and those for Examples 5 to 7 in Table 2. Soak being the time allowed after completion of catalyst and monomer injection before the reaction was terminated.

The process used was as follows:

| Example | 1 | 2 | 3 | 4 |
|---|---|---|---|---|
| Polymerisation Conditions | | | | |
| Temperature, °C. | 110 | 110 | 110 | 110 |
| $N_2$ pressure, psig | 90 | 90 | 90 | 90 |
| Time, mins: | | | | |
| Injection | 120 | 120 | 120 | 120 |
| Soak | 15 | 15 | 15 | 15 |
| Charged to Reactor | | | | |
| fumarate ester (grms) | 1311 | 1311 | 1311 | 1311 |
| vinyl acetate (grms) | 67.7 | 67.7 | 67.7 | 67.7 |
| cyclohexane (grms) | 208 | 208 | 312 | 312 |
| Injected during reaction | | | | |
| vinyl acetate (grms) | 244.5 | 244.5 | 244.5 | 244.5 |
| t-butyl peroactoate (grms) | 4.0 | 4.0 | 4.0 | 4.0 |
| in cyclohexane (grms) | 43.2 | 43.2 | 43.2 | 43.2 |
| Results | | | | |
| Yield(1) grms polymer | 1469 | 1476 | 1493 | 1480 |
| grams of active ingredient per 100 grams of fumarate ester charged | 102.3 | 102.2 | 102.3 | 100.6 |
| Dialysis: wt % residue | 91.3 | 90.8 | 90.7 | 89.1 |
| Free fumarate in polymer, wt. % | <0.1 | <0.1 | <0.1 | <0.1 |
| Fumarate conversion, % | >99.9 | >99.9 | >99.9 | >99.9 |
| Specific Viscosity (2) of stripped polymer: wt/vol | 0.26 | 0.29 | 0.24 | 0.21 |

TABLE 1 -continued

| Example | 1 | 2 | 3 | 4 |
|---|---|---|---|---|
| of dialysed residue: | 0.30) | 0.33) | 0.26) | |
| wt/vol | 0.31) | 0.32) | 0.26) | 0.23 |
| wt/wt | 0.25 | 0.24 | 0.20 | 0.20 |

TABLE 2

| Example | 5 | 6 | 7 |
|---|---|---|---|
| Polymerisation Conditions | | | |
| Temperature, °C. | 110 | 110 | 110 |
| $N_2$ pressure, psig | 90 | 90 | 90 |
| Time, mins: | | | |
| Injection | 120 | 120 | 120 |
| Soak | 15 | 15 | 15 |
| Charged to Reactor | | | |
| fumarate ester (Kilograms) | 3700 | 3700 | 4810 |
| vinyl acetate (Kilograms) | 191 | 191 | 247 |
| cyclohexane (Kilograms) | 587 | 587 | 1145 |
| Injected during reaction | | | |
| vinyl acetate (Kilograms) | 690 | 690 | 897 |
| t-butyl peroactoate (Kilograms) | 11.4 | 11.4 | 14.8 |
| in cyclohexane (Kilograms) | 124 | 124 | 161 |
| Results | | | |
| Yield Kilograms polymer | — | — | 1476 |
| grams of active ingredient per 100 grams of fumarate ester changed | 105 over all 3 batches | | 105 over all 3 batches |
| Dialysis: wt % residue | 97.4 | 95.0 | 89.6 |
| Free fumarate in polymer, wt. % | <0.1 | | |
| Fumarate conversion, % | >99.9 | | |
| Specific Viscosity (2) | | | |
| of stripped polymer: wt/vol | 0.35 | 0.34 | 0.23 |
| of dialysed residue: wt/vol | 0.32 | | 0.20 |
| wt/wt | 0.31 | 0.31 | 0.22 |

The effectiveness of the products of Examples 5 and 6 as pour point depressants were tested in five typical European multigrade lubricating oils, in a bright stock lubricating oil and in two typical European multigrade oils and the average pour depression obtained was found to be as follows:

| wt % Additive | Pour Depression | |
|---|---|---|
| | Example 5 | Example 6 |
| 0.2 | 13.3 | 13.5 |
| 0.3 | 16.7 | 16.0 |
| 0.4 | 17.5 | 19.2 |

EXAMPLES 8 TO 13

A series of polymethacrylates were prepared in the 3 liter reactor used in Example 1 with a 75 minute reaction time and continuous injection of the initiator for 1 hour followed by a soak time. The solvent was cyclohexane and the initiator t-butylperoctoate and polymerisation temperatures of 120° and 135° C. were used under a nitrogen pressure of 90 psi.

The results of the polymerisation reactions are shown in Table 2.

The alkyl ester of the methacrylate was straight chain and their composition was:

| Alkyl Group | wt. % |
|---|---|
| $C_{10}$ | 2.5 |
| $C_{12}$ | 55.5 |
| $C_{14}$ | 21.3 |
| $C_{16}$ | 10.7 |
| $C_{18}$ | 10.0 |

TABLE 2

| | Polymer Preparation and Properties | | | | |
|---|---|---|---|---|---|
| Example | Temp., °C. | Soak time, mins | Mole ratio monomer/ cyclohexane | Mole ratio initiator/ monomer × $10^3$ | Polymer sp. vis. (2 wt/vol % in toluene at 40° C.) |
| 8 | 135 | 10 | 0.06 | 7.4 | 0.14 |
| 9 | 135 | 10 | 0.24 | 7.4 | 0.33 |
| 10 | 135 | 10 | 0.47 | 7.4 | 0.61 |
| 11 | 135 | 10 | 0.93 | 7.4 | 1.54 |
| 12 | 120 | 15 | 0.47 | 7.4 | 0.74 |
| 13 | 120 | 15 | 0.93 | 7.4 | 1.84 |

The solvent and monomer were charged to the autoclave and the initiator was injected at a steady rate during the injection time.

EXAMPLES 14 TO 18

A series of polymethacrylates were prepared in the 3 liter reactor used in Example 1 with a 75 minute reaction time and continuous injection of the initiator for 1 hour followed by a soak time. The solvent was cyclohexane and the initiator t-butylperoxide, the polymerisation temperature 120° C. under a nitrogen pressure of 90 psi.

The results of the polymerisation reactions are shown in Table 3.

TABLE 3

| Example | Monomer | Mole ratio monomer/ cyclohexane | Mole ratio initiator/ monomer × $10^3$ | Polymer sp. vis. (2 wt/vol % in toluene at 40° C.) |
|---|---|---|---|---|
| 14 | dodecyl acrylate | 0.47 | 7.4 | 0.25 |
| 15 | dodecyl acrylate | 0.91 | 7.4 | 0.37 |
| 16 | stearyl acrylate | 0.91 | 7.4 | 0.49 |
| 17 | stearyl acrylate | 0.91 | 0.93 | 0.59 |
| 18 | stearyl acrylate | 1.72 | 0.93 | 0.94 |

We claim:

1. In a process for the preparation of additives for liquid hydrocarbon fuels, crude oils and lubricating oils, said process comprising the free radical, solution polymerisation or copolymerisation of unsaturated ester monomers selected from the group consisting of $C_1$ to $C_{30}$ acrylates, methacrylates and mixtures thereof, the improvement wherein the polymerisation or copolymerisation is conducted:

(a) under a blanket of inert gas, (b) at a controlled temperature within the range of 85° C. to 200° C., (c) at a controlled pressure within the range of 90 psi to 1600 psi, (d) said pressure being the pressure of the inert gas, the pressure of said gas being sufficient to prevent vaporization of the monomers and solvent during polymerization, and (e) with a free radical generating catalyst having a half life no greater than 2 hours at the reaction temperature.

2. A process according to claim 1 in which the free radical generating catalyst is injected into the reaction vessel during all or part of the reaction.

3. A process according to claim 1 in which the monomer is injected into the reaction vessel during the reaction.

4. A process according to claim 1 wherein said ester monomers are methacrylates.

5. A process according to claim 1 wherein said temperature is about 90° to 200° C.

6. A process according to claim 1 wherein said ester monomers are $C_1$ to $C_{30}$ alcohol esters of acrylic acid.

7. A process according to claim 5 wherein said ester monomers are $C_1$ to $C_{30}$ alcohol esters of methacrylic acid.

8. A process according to claim 1 wherein said polymerization is carried out in cyclohexane using tertiary butyl peroctoate as initiator.

9. A process according to claim 8 wherein said polymerization is carried out at about 110° C. under 90 p.s.i.g. pressure while injecting said peroctoate over about 2 hours, followed by a 15 minute soak period, then stripping off said cyclohexane to obtain said polymer.

10. A process according to claim 6, wherein said polymer is formed by polymerizing dodecyl acrylate or stearyl acrylate in cyclohexane with t-butylperoxide at about 120° C. under about 90 p.s.i.g. pressure.

11. A process according to claim 7, wherein a mixture of $C_8$ to $C_{18}$ alkyl methacrylates is polymerized in cyclohexane with t-butylperoctoate at about 120°–135° C. under 90 p.s.i.g.

12. A process according to claim 1 wherein said inert gas is nitrogen.

* * * * *